United States Patent

[11] 3,610,309

[72] Inventors Henry R. Fletcher, deceased
late of Ward End, Birmingham, England;
Agnes Marion Fletcher, legal
representative, 219, Coleshill Road, Ward
End, Birmingham 34, Warwickshire,
England
[21] Appl. No. 834,614
[22] Filed June 17, 1969
[45] Patented Oct. 5, 1971
[32] Priority June 22, 1968
[33] Great Britain
[31] 29880/68

[54] TIRES
2 Claims, 1 Drawing Fig.

[52] U.S. Cl. .................................................. 152/210
[51] Int. Cl. ...................................................... B60c 9/16
[50] Field of Search ........................................ 152/210, 211, 212

[56] References Cited
UNITED STATES PATENTS
2,910,104 10/1959 Billingsley .................... 152/211
3,057,389 10/1962 Dubetz et al .................. 152/210

Primary Examiner—James B. Marbert
Attorney—Stevens, Davis, Miller & Mosher

ABSTRACT: A pneumatic tire having tread or subtread incorporating lengths of steel wires substantially shorter than thread width distributed throughout the depth and circumference of the tread, subtread or both, each wire having a diameter of substantially 0.003 of an inch or less.

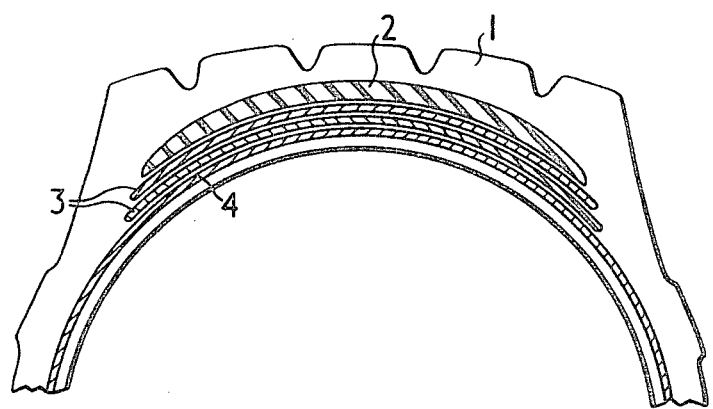

TIRES

This invention relates to pneumatic tires.

Pneumatic tires hitherto known having a damage-resistant tread or subtread for use on earthmover and off-the-road truck tires generally comprise a limited weight of small lengths of steel filaments, of at least 0.0059 inches diameter disposed in said tread or subtread. However, such constructions suffer from lack of homogeneity and consequently a tendency of the tread to tear, split or chunk exists.

It is an object of the present invention to reduce or substantially eliminate the aforesaid difficulties.

According to the present invention there is provided a pneumatic tire having a tread or subtread incorporating lengths of steel wires substantially shorter than the tread width distributed throughout the depth and circumference of the tread or subtread or both, each wire having a diameter of substantially 0.003 of an inch or less.

Said lengths may be nonorientated.

Alternatively said lengths are orientated in any specific direction e.g. circumferentially.

One embodiment of the invention will now be described in more detail by way of example with reference to the accompanying drawing which shows a diagrammatic fragmentary axial cross-sectional view of a pneumatic tire according to the embodiment.

An earthmover tire comprises a radial ply carcass reinforcement 4 and a breaker assembly 3. The tread composition 1 comprises a polyisoprene rubber composition of approximately 73° Shore hardness to which a plurality of steel filaments each of length between ½ and 3 inches and of diameter approximately 0.003 inches has been added and intimately mixed, to achieve a random distribution and orientation of steel filaments within said base. Said random distribution and orientation exists circumferentially axially and radially. The subtread 2 of the tire is devoid of steel filament reinforcement.

A tire constructed according to the invention has many advantages. The use of fine wire as compared with coarser wire hitherto used permits a much greater number of individual filaments to be used for the same weight and consequently homogeneity of the tread compound is improved, producing a tire of more uniform performance. In addition said greater number of filaments has a substantially greater surface area and thus bonding between the tread or subtread composition and said filaments is substantially improved.

General handling and processing of the filaments, tread compositions and the tire is also improved due to increased flexibility of the wires, ease of cutting the wires and mixing of the tread composition.

Having now described my invention what I claim is:

1. A pneumatic tire having tread or subtread incorporating lengths of steel wires substantially shorter than tread width distributed randomly throughout the depth and circumference of the tread, subtread or both, each wire having a diameter of substantially 0.003 of an inch or less.

2. A pnuematic tire according to claim 1 wherein the length of each of the said lengths is between ½ and 3 inches.